US011466987B2

(12) United States Patent
Kozuma et al.

(10) Patent No.: US 11,466,987 B2
(45) Date of Patent: Oct. 11, 2022

(54) GYROSCOPE AND ANGLE MEASUREMENT METHOD

(71) Applicants: TOKYO INSTITUTE OF TECHNOLOGY, Tokyo (JP); OSAKA UNIVERSITY, Osaka (JP); JAPAN AVIATION ELECTRONICS INDUSTRY, LIMITED, Tokyo (JP); MITSUBISHI HEAVY INDUSTRIES, LTD., Tokyo (JP)

(72) Inventors: Mikio Kozuma, Kanagawa (JP); Ryotaro Inoue, Tokyo (JP); Takashi Mukaiyama, Osaka (JP); Utako Tanaka, Osaka (JP); Seiichi Morimoto, Tokyo (JP); Kazunori Yoshioka, Tokyo (JP); Atsushi Tanaka, Tokyo (JP); Yuichiro Kamino, Tokyo (JP)

(73) Assignees: TOKYO INSTITUTE OF TECHNOLOGY, Tokyo (JP); OSAKA UNIVERSITY, Osaka (JP); JAPAN AVIATION ELECTRONICS INDUSTRY, LIMITED, Tokyo (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 300 days.

(21) Appl. No.: 16/753,176

(22) PCT Filed: Jul. 25, 2018

(86) PCT No.: PCT/JP2018/027828
§ 371 (c)(1),
(2) Date: Apr. 2, 2020

(87) PCT Pub. No.: WO2019/077829
PCT Pub. Date: Apr. 25, 2019

(65) Prior Publication Data
US 2020/0300630 A1 Sep. 24, 2020

(30) Foreign Application Priority Data

Oct. 18, 2017 (JP) .............................. JP2017-201527

(51) Int. Cl.
*G01C 19/58* (2006.01)
(52) U.S. Cl.
CPC ................................... *G01C 19/58* (2013.01)
(58) Field of Classification Search
CPC ............................................ G01C 19/58–728
See application file for complete search history.

(56) References Cited

U.S. PATENT DOCUMENTS 7,180,078 B2 * 2/2007 Pau .......................... H01J 49/42
250/378
9,548,179 B2 * 1/2017 Cho ........................ H01J 49/422
(Continued)

FOREIGN PATENT DOCUMENTS

JP  2000-155028 A  6/2000
JP  2007-85957 A  4/2007

OTHER PUBLICATIONS

Knoop, M et al. "Chapter 1: Physics with Trapped Charged Particles." arXiv: Atomic Physics (2013): 1-24., Lectures from the Les Houches Winter School, Published Nov. 28, 2013, https://arxiv.org/ftp/arxiv/papers/1311/1311.7220.pdf (Year: 2013).*

(Continued)

*Primary Examiner* — Violeta A Prieto
(74) *Attorney, Agent, or Firm* — Greenblum & Bernstein, P.L.C.

(57) ABSTRACT

The present invention reduces measurement time. A gyroscope of the present invention includes a planar ion trap part, a microwave irradiation part, a laser irradiation part and a measurement part. The planar ion trap part includes two rf electrodes and two DC electrode rows, and forms ion traps that trap one ion on a substrate, a normal direction of the (Continued)

surface of the planar ion trap part corresponds to a z direction. The rf electrodes are disposed in the x direction on the substrate at a predetermined interval. The DC electrode rows are disposed in the x direction on the substrate so as to sandwich the two rf electrodes. The DC electrode rows each include at least five DC electrodes in the x direction. The trapped ions are spaced so as not to interfere with each other. The microwave irradiation part irradiates the ions with $\pi/2$ microwave pulses.

5 Claims, 4 Drawing Sheets

(56) References Cited

U.S. PATENT DOCUMENTS

| | | | | |
|---|---|---|---|---|
| 10,242,859 | B2* | 3/2019 | Kim | H01J 49/424 |
| 10,248,911 | B2* | 4/2019 | Kim | H01J 3/00 |
| 10,553,414 | B2* | 2/2020 | Youngner | H01J 49/063 |
| 11,025,228 | B1* | 6/2021 | Ascarrunz | G06N 10/40 |
| 11,049,713 | B1* | 6/2021 | Kokish | H01J 49/0036 |
| 2006/0169882 | A1* | 8/2006 | Pau | H01J 49/0018 |
| | | | | 428/161 |
| 2013/0270433 | A1* | 10/2013 | Ding | G06T 5/00 |
| | | | | 250/281 |
| 2014/0263992 | A1* | 9/2014 | Ding | H01J 49/10 |
| | | | | 250/252.1 |
| 2016/0027604 | A1* | 1/2016 | Cho | H01J 49/0013 |
| | | | | 250/489 |
| 2017/0221693 | A1* | 8/2017 | Kim | H01J 49/0018 |
| 2017/0316335 | A1* | 11/2017 | Kim | H01J 3/00 |
| 2019/0189419 | A1* | 6/2019 | Kim | H01J 3/40 |
| 2022/0037313 | A1* | 2/2022 | Deen | H01L 29/945 |

OTHER PUBLICATIONS

Chiaverini J. er al., "Surface-Electrode Architecture for Ion-Trap Quantum Information Processing", Quantum Information and Computation, vol. 5, No. 6 (2005), Jul. 6, 2005, pp. 419-439.
Stick D. et al., "Ion trap in a semiconductor chip", Nature Physics, vol. 2, Dec. 11, 2005, pp. 36-39.
Kielpinski D. et al., "Architecture for a large-scale ion-trap quantum computer", Nature, vol. 417, Jun. 13, 2002, pp. 709-711.
Gariddo A., "Compact chip-scale guided cold atom gyrometers for inertial navigation: Enabling technologies and design study", AVS Quantum Science, 1, 014702 , Dec. 13, 2019, pp. 014702-1 to 014702-18.
Seidelin S. et al.,"A microfabricated surface-electrode ion trap for scalable quantum information processing", arXiv:quant-ph/0601173v1, Jan. 26, 2006, pp. 1-5.
Narayanan S. et al., "Electric field compensation and sensing with a single ion in a planar trap", Journal of Applied Physics, 110, Dec. 12, 2011, pp. 114909-1 to 114909-5.
Feb. 24, 2021 Australian Examination report No. 1 for standard patent application in Australian Application No. 2018353571.
Yoshihiko Arita et al: Laser-induced rotation and cooling of a trapped microgyroscope in vacuum; Nature Communications, vol. 4, Aug. 28, 2013, pp. 1-7.
Oct. 2, 2020 Extended European Search Report in European Application No. 18868720.6.
International Search Report issued in International Application No. PCT/JP2018/027828, dated Oct. 23, 2018.
Campbell et al., "Rotation sensing with trapped ions", Journal of Physics B: Atomic, Molecular and Optical Physics, vol. 50, Feb. 23, 2017, pp. 1-8.
Tanaka et al., "Design of a surface electrode trap for parallel ion strings", Journal of Physics B: Atomic, Molecular and Optical Physics, vol. 47, Jan. 16, 2014, pp. 1-7.
Tanaka et al., "Micromotion compensation in a surface electrode trap by parametric excitation of trapped ions", Appl Phys B, Oct. 13, 2011, pp. 907-912.
Mizrahi et al., "Ultrafast Spin-Motion Entanglement and Interferometry with a Single Atom", Physical Review Letters PRL 110, Feb. 14, 2013, pp. 1-5.

* cited by examiner (i) Prepare the ion in $|\downarrow\rangle$ and apply a $\pi/2$ pulse of microwaves about $-\hat{Y}$.

(ii) Apply $N_k$ spin-dependent kicks (SDKs) in the $x$-direction ($\Delta p = -N_k \hbar \Delta k \hat{\sigma}_z$) to separate the atom in momentum space.

(iii) Apply a step function in electrode voltages to non-adiabatically ($t \ll 2\pi/\omega$) displace the trap center in the $y$-direction a distance $y_0$.

(iv) Allow the ion to oscillate in the trap for an integer number ($M$) of round trips $\Delta t = M 2\pi/\omega$.

(v) Reverse step (iii) by non-adiabatically switching the trap voltages back to their original values.

(vi) Reverse step (ii) by applying $N_k$ SDKs in the other direction ($\Delta p = N_k \hbar \Delta k \hat{\sigma}_z$) to close the interferometer.

(vii) Apply another $\pi/2$ pulse with microwaves about an axis inclined by $\phi$ in the $X, Y$ plane from the $-\hat{Y}$ axis of the Bloch sphere, then measure the internal state of the ion in the qubit basis.

FIG. 1

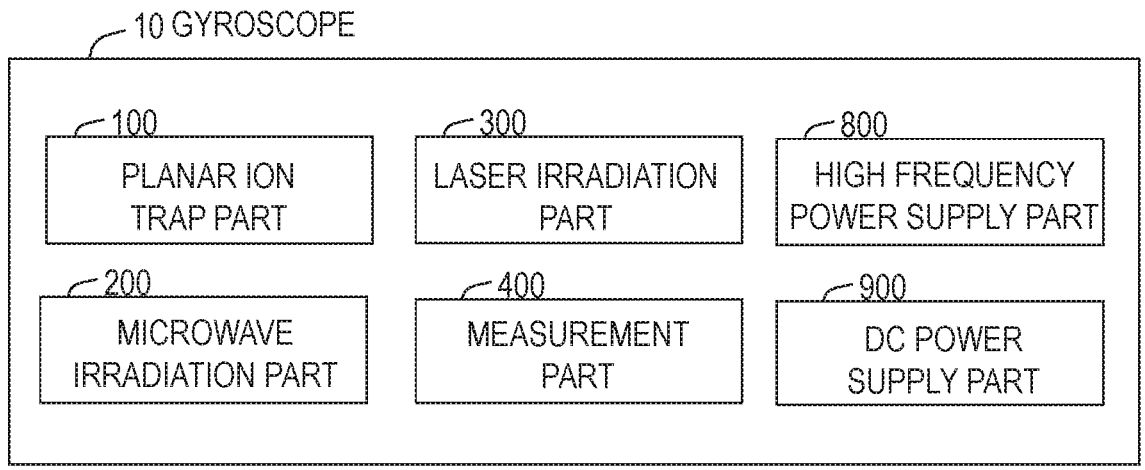

FIG. 2

GYROSCOPE AND ANGLE MEASUREMENT METHOD

TECHNICAL FIELD

The present invention relates to a gyroscope and an angle measurement method using trapped ions.

BACKGROUND ART

A gyroscope using trapped ions described in Non-patent literature 1 is known as a prior art. FIG. 1 illustrates an overview of an angle measurement method shown in Non-patent literature 1. Non-patent literature 2 shows a technique for changing momenta of ions, which is available in the art in Non-patent literature 1, Non-patent literatures 3 and 4 describe arts relating to planar ion trap, which are known as techniques for capturing ions on a substrate.

PRIOR ART LITERATURE

Non-Patent Literature

Non-patent literature 1: W C Campbell and P Hamilton, "Rotation sensing with trapped ions", Journal of Physics B: Atomic, Molecular and Optical Physics, vol. 50 (2017) 064002.

Non-patent literature 2 J. Mizrahi, C. Senko, B. Neyenhuis, K. G. Johnson, W. C. Campbell, C. W. S. Conover, and C. Monroe, "Ultrafast Spin-Motion Entanglement and interferometry with a Single Atom", PHYSICAL REVIEW LETTERS, PRL 110, 203001 (2013).

Non-patent literature 3: U. Tanaka, K. Masuda, Y. Akimoto, K. Koda, Y Ibaraki and S. Urabe "Micromotion compensation in a surface electrode trap by parametric excitation of trapped ions", Appl Phys B (2012) 107: pp. 907-912.

Non-patent literature 4: Utako Tanaka, Kensuke Suzuki, Yuki Ibaraki and Shinji Urabe, "Design of a surface electrode trap for parallel ion strings", Journal of Physics B: Atomic, Molecular and Optical Physics, vol. 47 (2014) 035301.

SUMMARY OF THE INVENTION

Problems to be Solved by the Invention

The gyroscope shown in Non-patent literature 1 measures an angle by monitoring internal states of ions (indicating either one of the two energy levels of a ground state). After performing operation of an interference system, which state ions are in is a probability event, and so a plurality of times of monitoring are required to measure angles. Therefore, a problem is that measurement takes time.

It is therefore an object of the present invention to shorten measurement time.

Means to Solve the Problems

First, an x direction, a y direction and a z direction are assumed to be directions orthogonal to each other. A gyroscope of the present invention comprises a planar ion trap part, a microwave irradiation part, a laser irradiation part and a measurement part. The planar ion trap part forms an ion trap to trap one ion on a substrate, and a normal direction of a surface of the planar ion trap part corresponds to the z direction. The planar ion trap part comprises two rf electrodes and two DC electrode rows. The two rf electrodes are disposed in the x direction on the substrate at a predetermined interval. The two DC electrode rows are disposed in the x direction on the substrate so as to sandwich the two rf electrodes. The DC electrode rows comprise at least five DC electrodes in the x direction. When a plurality of ion traps are formed, the trapped ions are spaced so as not to interfere with each other. The microwave irradiation part irradiates the ions with $\pi/2$ microwave pulses. The laser irradiation part changes momenta of the ions in the x direction. The measurement part monitors internal states of the ions and measures an angle.

Effects of the Invention

According to the gyroscope of the present invention, it is possible to trap ions linearly so that a plurality of ions do not interfere with each other, and thereby perform microwave irradiation and laser pulse irradiation onto a plurality of ions at a time. It is possible to monitor internal states of the plurality of ions, measure an angle based on the result, and thereby shorten the measurement time.

BRIEF DESCRIPTION OF THE DRAWINGS

FIG. 1 is a diagram illustrating an overview of an angle measurement method shown in Non-patent literature 1;

FIG. 2 is a diagram illustrating a configuration example of a gyroscope of the present invention;

DETAILED DESCRIPTION OF THE EMBODIMENTS

Figure 3:
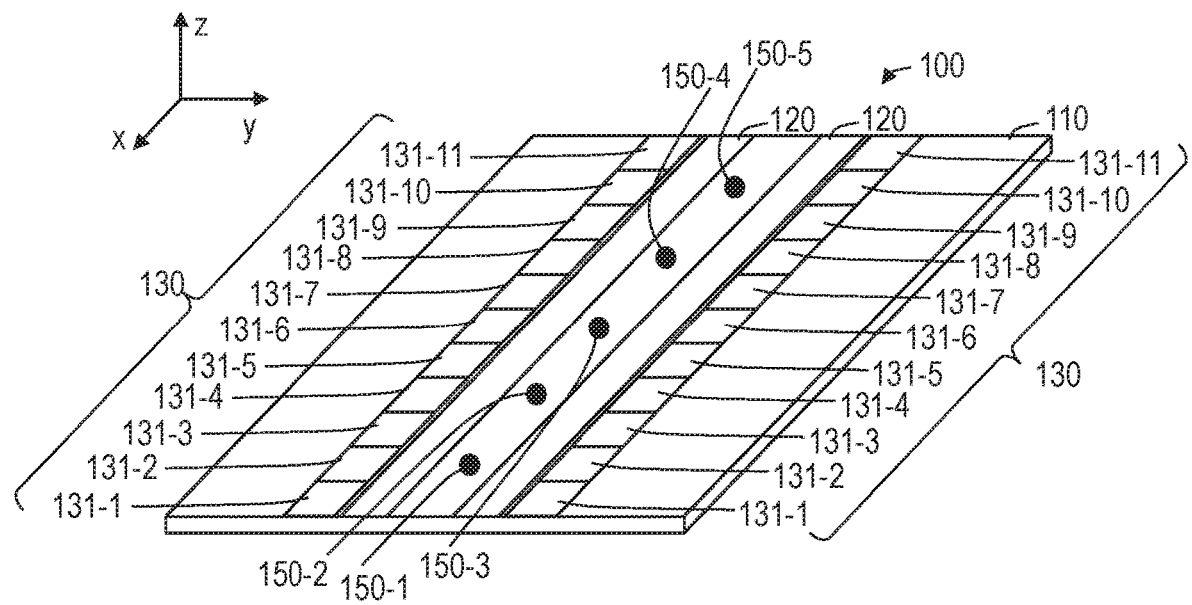
FIG. 3 is a diagram illustrating a configuration example of the planar ion trap part.

Hereinafter, an embodiment of the present invention rill be described in detail. Note that components having the same functions are assigned the same reference numerals and duplicate description will be omitted.

First Embodiment

Figure 4:
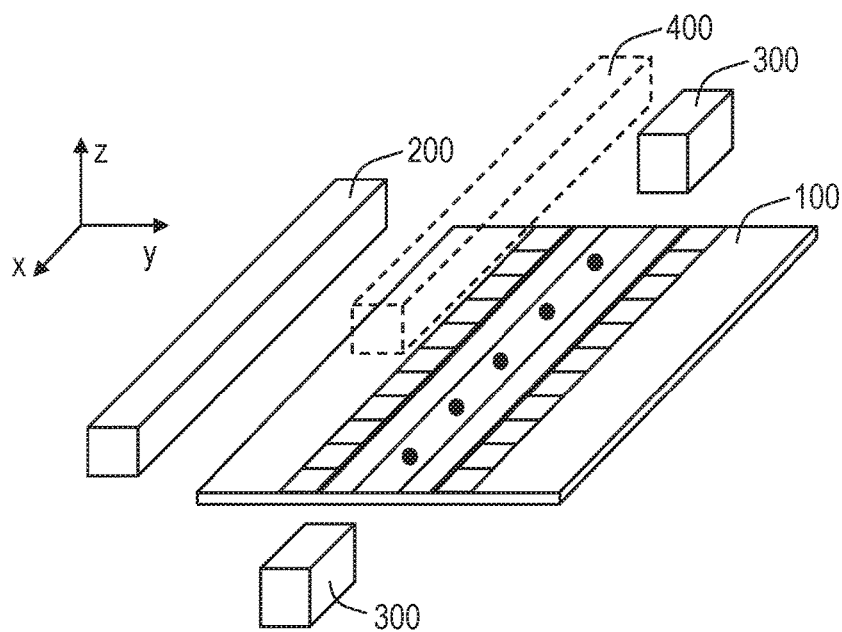
FIG. 4 is a diagram illustrating an arrangement example of the planar ion trap part, the microwave irradiation part, the laser irradiation part and the measurement part.
Figure 5:
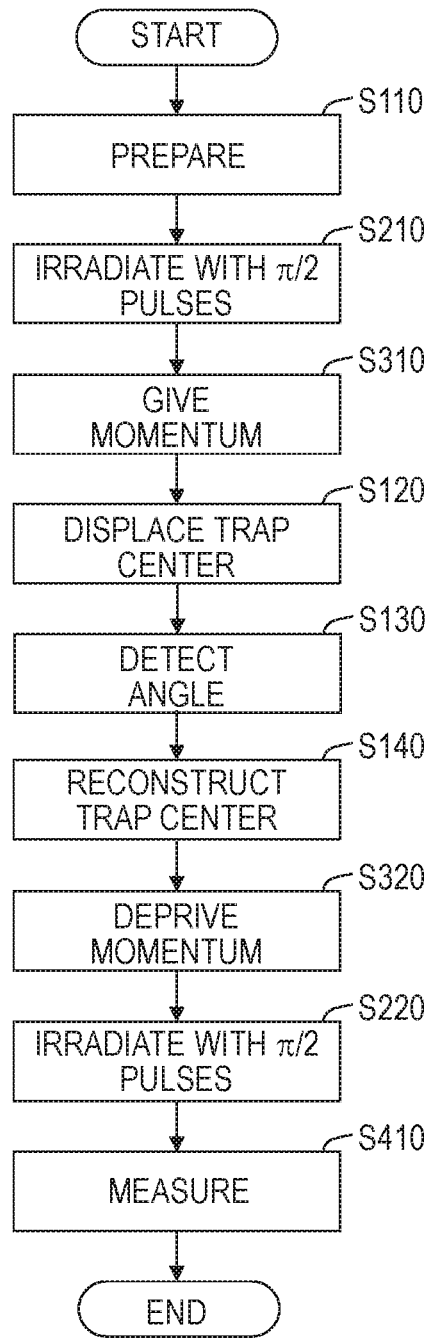
FIG. 5 is a diagram illustrating a processing flow of an angle measurement method.
Figure 6A:
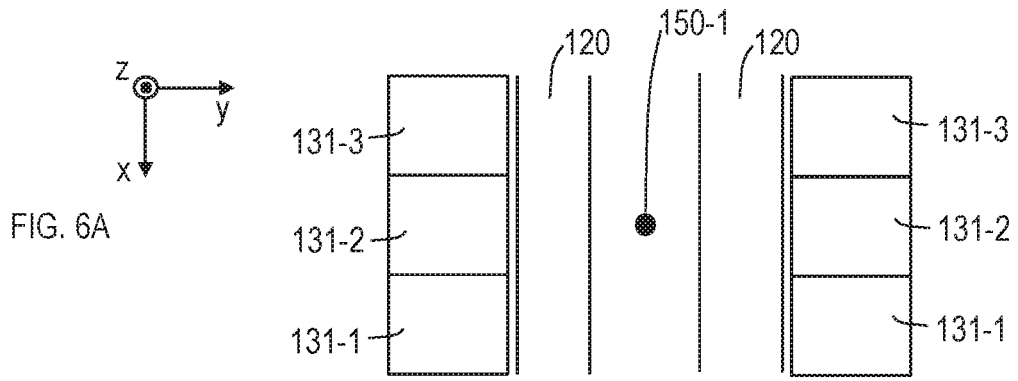
FIG. 6A is a diagram illustrating a state in which an ion is stationary.
Figure 6B:
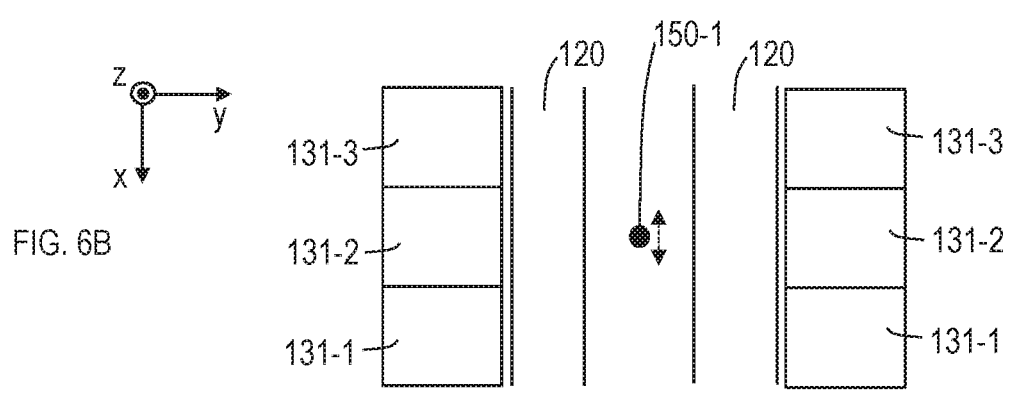
FIG. 6B is a diagram illustrating a state in which an ion is vibrating in the x direction.
Figure 6C:
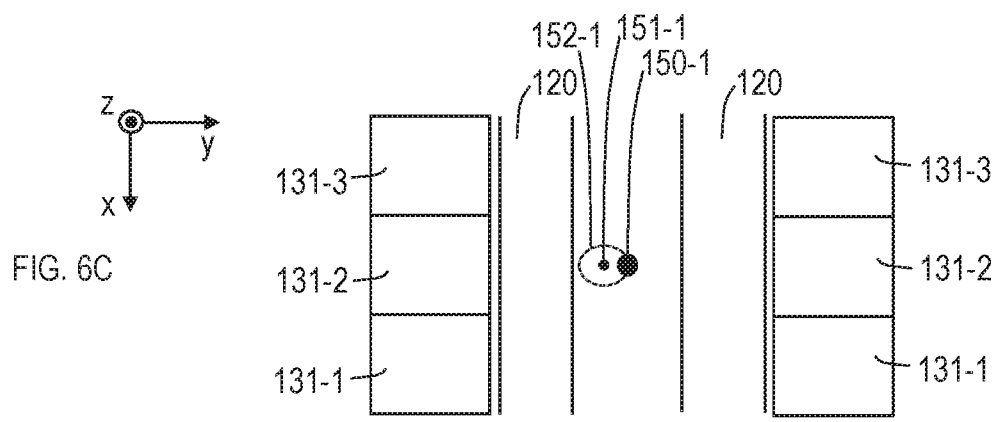
FIG. 6C is a diagram illustrating a state in which an ion is in circular motion.

FIG. 2 illustrates a configuration example of a gyroscope of the present invention. The gyroscope 10 is provided with a planar ion trap part 100, a microwave irradiation part 200, a laser irradiation part 300, a measurement part 400, a high frequency power supply part 800 and a DC power supply part 900. FIG. 3 is a diagram illustrating a configuration example of the planar ion trap part, FIG. 4 is a diagram illustrating an example of arrangement of the planar ion trap part, the microwave irradiation part, the laser irradiation part and the measurement part. FIG. 5 is a diagram illustrating a processing flow of an angle measurement method and FIG. 6A to FIG. 6C are diagrams illustrating a state of motion of an ion. FIG. 6A is a diagram illustrating a state in which an ion is stationary, FIG. 6B is a diagram illustrating a state in which an ion is vibrating in the x direction and FIG. 6C is a diagram illustrating a state in which an ion is in circular motion.

First, the x direction, the y direction and the z direction are assumed to be directions orthogonal to one another. The planar ion trap part 100 can form a plurality of ion traps, each trapping one ion in the x direction on a substrate 110, a normal direction of the surface of the planar ion trap part corresponds to the z direction. The gyroscope 10 uses two energy levels of trapped ions in the ground state. As such ions, ions for which it is possible to use levels that are not affected by a magnetic field are suitable, and examples of such ions include cadmium ions and ytterbium ions. However, if some measures are taken to suppress influences of the magnetic field, ions are not limited to them and other ions may also be used.

More specifically-, the planar ion trap part 100 includes two rf electrodes 120 and two DC electrode rows 130 on the substrate 110. The rf electrodes 120 are disposed in the x direction on the substrate 110 at a predetermined interval. The predetermined interval is, for example, on the order of 100 μm. The width of the rf electrode may be set to on the order of several hundreds μm to 1 mm. The two DC electrode rows 130 are disposed in the x direction on the substrate 110 so as to sandwich the two rf electrodes 120. The high frequency power supply part 800 is connected to the rf electrodes 120 to trap ions in the y and z directions. The DC electrode row 130 is constructed of a plurality of DC electrodes 131. In FIG. 3, the DC electrode row 130 is represented as a row of eleven DC electrodes 131-1, ..., 11 and ions 150-1, ..., 5 are trapped at positions corresponding to the DC electrodes 131-2, 4, 6, 8 and 10. In the case of FIG. 3, the DC power supply part 900 may apply voltages to the DC electrodes 13-1, 3, 5, 7, 9 and 11 to trap ions in the x direction. Note that in order for the planar ion trap part 100 to form two ion traps, the DC electrode row 130 may include at least five DC electrodes 131-1, ..., 5 in the x direction. In order to increase the number of ions to be monitored simultaneously, the number of DC electrodes may be increased. In the example of FIG. 3, there is only one DC electrode between ions, but a plurality of DC electrodes may also be placed between ions.

The planar ion trap part 100 can displace the center of each ion trap along the y direction. The DC power supply part 900 may apply a bias voltage between the two DC electrode rows 130. For example, if the DC power supply part 900 applies a bias voltage to one of the two DC electrode rows 130, the trap center can be displaced in the y direction. More specifically, if a positive bias voltage is applied to all the DC electrodes 131-1, ..., 11 constituting the DC electrode row 130 on the right side in FIG. 3, the trap center can be shifted in a −y direction. Of course, a positive bias voltage may be applied to the one DC electrode row 130 and a negative bias voltage may be applied to the other DC electrode row 130. The plurality of ion traps have such an interval that trapped ions do not interfere with each other. In order to prevent ions from interfering with each other, for example, the interval may be on the order of 1 mm. That is, the width of each DC electrode 131-1, ..., 11 in the x direction may be set to on the order of 0.5 mm.

The planar ion trap part 100, the microwave irradiation part 200, the laser irradiation part 300 and the measurement part 400 may be disposed as shown in FIG. 4. The microwave irradiation part 200 irradiates the ions 150-1, ..., 5 with π/2 microwave pulses from any one direction, FIG. 4 illustrates an example in which a microwave is radiated from the y direction. The "π/2 pulse" is a pulse, an existence probability in the internal state of which becomes half. The laser irradiation part 300 radiates two laser beams from opposite directions in the x direction and changes momenta in the x direction of the ions 150-1, ..., 5. One of the two laser beams is a laser beam corresponding to one energy level in a ground state and an energy level in an excited state. The other of the two laser beams is a laser beam corresponding to the other one energy level in the ground state and the energy level in the excited state. The two laser beams are predetermined laser pulses. Further details are described in Non-patent literature 2. The measurement part 400 monitors the internal states of the ions from the z direction and measures an angle, A general technique for detecting fluorescence from ions (fluorescence technique) may be used for monitoring.

Next, a processing flow of the angle measurement method will be described with reference to FIG. 5, FIG. 6A to FIG. 6C. FIG. 6A to FIG. 6C show enlarged views of only a part of the ion 150-1. FIG. 6A illustrates a state in which an ion is stationary, FIG. 6B illustrates a state in which an ion is vibrating in the x direction and FIG. 6C illustrates a state in which an ion is in circular motion.

The gyroscope 10 forms a plurality of ion traps and sets internal states of trapped ions to predetermined states (preparation step S110). More specifically, the internal states of at least the ions to be monitored are aligned with one of the ground states. Generally, all the trapped ions are considered to be ions to be monitored, but ions for other purposes may also be trapped, and so the ions are described here as "at least ions to be monitored." The same applies hereinunder. Next, the microwave irradiation part 200 irradiates at least ions to be monitored with π/2 microwave pulses (first microwave step S210). In this step, a superposition state in which two different internal states each representing 50% is generated. The ions are stationary as shown in FIG. 6A until this step.

The laser irradiation part 300 irradiates at least ions to be monitored with laser pulses and gives momentum in the x direction (first laser step S310). Through one irradiation of laser pulse, irradiation with two laser pulses shown in Non-patent literature 2 may be performed. Through irradiation with laser pulses, the ions are kicked and given momentum, and at the same time, the internal states of the ions are changed. Of the two internal states, the direction of the given momentum reverses depending on which of the two internal states is changed to which state. Therefore, if the ions are irradiated with the same two laser pulses again after a half cycle of vibration of the ions, momentum is further given and the internal states of the ions are changed. That is, when irradiation with laser pulse is repeated in every half cycle of vibration of ions after starting from a state in which ions are stationary, greater momentum can be added (this point will be described later more specifically). The number of times irradiations (kicks) with laser pulse are performed may be set to on the order of 100. In this step, the ions vibrate in the x direction as shown in FIG. 6B. Note that the direction in which momentum is given is reversed depending on the internal states of the ions, and so ions in the same internal state vibrate in the same phase and ions in different states vibrate in opposite phases.

The above-described contents will be described more specifically. For example, the two ground states used by the gyroscope 10 are assumed to be |g> and |e>. When the ground state |g> is changed to the ground state |e> through irradiation with laser pulse, momentum is assumed to be given in the positive direction of the x direction and when ground state |e> is changed to the ground state |g>, momentum is assumed to be given in the negative direction of the x direction. When ions in a stationary state are irradiated with laser pulse, ions in the ground state $|g\rangle$ are replaced by ions in the ground state $|e\rangle$ and move toward the positive direction of the x direction. After a half cycle of vibration of ions, the ions move toward the negative direction of the x direction. If ions are irradiated with laser pulses at this timing, the state is changed to the ground state $|g\rangle$ and momentum is further given in the negative direction of the x direction. After another half cycle, ions further move in the positive direction of the x direction. When ions are irradiated with laser pulses at this timing, the state is changed to the ground state $|e\rangle$ and further momentum is given in the positive direction of the x direction, Thus, after starting from the state in which ions are stationary, if irradiation with laser pulses is repeated in every half cycle of vibration of ions, greater momentum can be added. Note that ions in the ground state $|e\rangle$ in the stationary state are given momentum while moving in the direction opposite to the above direction. In the case of this method, momentum can be given in every half cycle of vibration of ions, and the same two laser pulses may be radiated every time, and therefore momentum can be given in a shorter time and the apparatus can be simply configured.

The DC power supply part 900 gives a bias voltage between the two DC electrode rows 130 of the planar ion trap part 100 and displaces the position of at least the trap center to be monitored among the plurality of ion traps in the y direction by a predetermined distance (trap center displacing step S120). Through this processing, ions vibrate in they direction as well. FIG. 6C illustrates that the trap center 151-1 of the ion trap displaces and the ion 150-1 moves along a circular trajectory 152-1 shown by a dotted line. When the first laser step S310 is executed, ions in the same internal state vibrate in the x direction in the same phase and ions in different states vibrate in the x direction in opposite phases, and therefore when the trap center displacing step S120 is executed, ions in the same internal state rotate in the same direction and ions in different states rotate in opposite directions.

When the trap center displacing step S120 is executed, ions are rotating in a direction depending on the internal state. Since the gyroscope 10 is affected by the rotation in the z-axis direction, the gyroscope 10 waits for a time required for ions to rotate a predetermined number of times (angle detection step S130). Since the time required for an ion to make one rotation is approximately the gyroscope 10 waits approximately 10 sec for an ion to rotate 10,000 times. In this case, when time for other processing is taken into consideration, monitoring can be conducted at an interval on the order of 20 sec. When monitoring is conducted with the number of ions to be trapped set to a number of ions necessary for one measurement, an angle can be measured at an interval of 20 sec.

The DC power supply part 900 eliminates the bias voltage between the two DC electrode rows 130 of the planar ion trap part 100 to thereby return the position of at least the trap center to be monitored among the plurality of ion traps to the original position (trap center reconstruction step S140). Through this processing, the ion returns to the state in which the ion vibrates in the x direction as shown in FIG. 6B.

The laser irradiation part 300 irradiates at least ions to be monitored with laser pulses to thereby deprive the ions of momentum in the x direction (second laser step S320). The laser irradiation part 300 irradiates (kicks) the ions with laser pulses at timing opposite to that in the first laser step S310 to thereby deprive the ions of momentum. More specifically, the laser irradiation part 300 may irradiate a plurality of laser pulses in every half cycle of vibration of ions after an integer multiple of the cycle of vibration of ions since the last irradiation with laser pulse in the first laser step S310. At this timing, it is possible to deprive ions of momentum with the same laser pulse as that in the first laser step S310. The number of times ions are irradiated with laser pulses may be the same as that in the first laser step S310. This processing causes the ion to return to the state in which the ion is stationary as shown in FIG. 6A.

The above-described contents will be described more specifically. The state of each ion is changed from the ground state $|g\rangle$ to the ground state $|e\rangle$ through the last irradiation with laser pulse in the first laser step S310 and the ions with momentum in the positive direction of the x direction added advance in the positive direction of the x direction in the ground state $|e\rangle$ after an integer multiple of the cycle since this irradiation with laser pulse. If ions are irradiated with laser pulses at this timing, ions are changed to the ground state $|g\rangle$ and given momentum in the negative direction of the x direction. That is, the ions are deprived of momentum corresponding to one irradiation with laser pulses, and although the ions advance in the positive direction of the x direction, their speeds slow down. After the half cycle of vibration of ions, these ions advance in the negative direction of the x direction. If ions are irradiated with laser pulses at this timing, the state of each ion is changed to the ground state $|e\rangle$ and momentum is given in the positive direction of the x direction. That is, the ions are deprived of momentum corresponding to one irradiation with laser pulse again, and the ions advance in the negative direction of the x direction, but their speeds further slow down. After another half cycle, the ions advance in the positive direction of the x direction. If the ions are irradiated with laser pulse at this timing, the states of the ions are changed to the ground state $|g\rangle$ and momentum is given in the negative direction of the x direction, Thus, it is possible to deprive ions of momentum by repeating irradiation with laser pulse in every half cycle of vibration of ions since the start after an integer multiple of the cycle of vibration of ions since the last irradiation with laser pulse onto ions in the first laser step S310. The ions whose ground state has been changed to $|g\rangle$ by the last irradiation with laser pulse in the first laser step S310 are deprived of momentum while moving in a direction opposite to the above-described direction. Note that even when irradiation with laser pulse in every half cycle has not been performed in the first laser step S310, if the laser irradiation part 300 repeatedly irradiates ions with laser pulses in every half cycle of vibration of ions after an integer multiple of the cycle of vibration of ions since the last irradiation with laser pulses to add momentum to the ions in the first laser step S310, it is possible to deprive ions of momentum likewise.

The microwave irradiation part 200 irradiates at least ions to be monitored with π/2 microwave pulses (second microwave step S220).

The measurement part 400 monitors an internal state of each ion and measures an angle (measurement step S410). A general technique for detecting fluorescence from ions (fluorescence technique) may be used for measurement. Since a probability of internal states can be estimated from internal states of a plurality of ions, an angle may be measured based on this probability.

The gyroscope according to the present invention can trap a plurality of ions linearly such that the ions do not interfere with each other, and can thereby perform irradiation with microwave and irradiation with laser pulses onto a plurality of ions at a time. The gyroscope of the present invention can also monitor internal states of a plurality of ions and measure an angle from the measurement result, and can thereby shorten measurement time.

What is claimed is:

1. A gyroscope comprising:
a planar ion trap part to form a plurality of ion traps, each trapping one ion on a substrate, a normal direction to a surface of the planar ion trap part corresponding to a z direction, wherein an x direction, a y direction, and the z direction are orthogonal to each other;
a microwave irradiation part to irradiate the one ion with $\pi/2$ microwave pulses;
a laser irradiation part to change the momentum of the one ion in the x direction; and
a measurement part to monitor an internal state of the one ion and measure an angle thereof,
the planar ion trap part comprising:
two rf electrodes disposed in the x direction on the substrate at a predetermined interval; and
two DC electrode rows disposed in the x direction on the substrate so as to sandwich the two rf electrodes therebetween,
the DC electrode rows each including at least five DC electrodes disposed in the x direction, and
each ion trap of the plurality of ion traps being spaced from another ion trap at an interval therebetween such that ions to be trapped do not interfere with each other when the plurality of ion traps are formed.

2. An angle measurement method using a gyroscope having: a planar ion trap part to form a plurality of ion traps, each trapping one ion on a substrate, a normal direction of a surface of the planar ion trap part corresponding to a z direction, wherein an x direction, a y direction and the z direction are orthogonal to each other; a microwave irradiation part to irradiate the one ion with $\pi/2$ microwave pulses; a laser irradiation part to change the momentum of the one ion in the x direction; and a measurement part to monitor an internal state of the one ion and measure an angle thereof, the planar ion trap part including: two rf electrodes disposed in the x direction on the substrate at a predetermined interval; and two DC electrode rows disposed in the x direction on the substrate so as to sandwich the two rf electrodes therebetween, the DC electrode rows each including at least five DC electrodes disposed in the x direction, and each ion trap of the plurality of ion traps being spaced from another ion trap at interval therebetween such that ions to be trapped do not interfere with each other when the plurality of ion traps are formed, wherein the method comprising:
forming the plurality of ion traps to be spaced from each other at an interval therebetween such that ions to be trapped in the ion traps do not interfere with each other and setting internal states of trapped ions to predetermined states;
irradiating the ions with $\pi/2$ microwave pulses from the microwave irradiation part;
irradiating the ions with laser pulses to give the ions momentum in the x direction using the laser irradiation part in a first laser irradiation operation;
providing a bias voltage between the two DC electrode rows of the planar ion trap part and displacing positions of trap centers of the plurality of ion traps by a predetermined distance in the y direction;
waiting for a time when the ions rotate a predetermined number of times;
returning the positions of the trap centers of the plurality of ion traps to their original positions before the providing of the bias voltage;
irradiating the ions with laser pulses from the laser irradiation part in a second laser irradiation operation to deprive the ions of momentum in the x direction;
irradiating the ions with $\pi/2$ microwave pulses from the microwave irradiation part; and
monitoring with the measurement part the internal states of the respective ions and measuring an angle thereof.

3. The angle measurement method according to claim 2, wherein in the first laser irradiation operation, the laser irradiation part irradiates the ions with laser pulses a plurality of times in every half cycle of vibration of the ions.

4. The angle measurement method according to claim 2, wherein in the second laser irradiation operation, the laser irradiation part irradiates the ions with a plurality of laser pulses in every half cycle of vibration of the ions after an integer multiple of the cycle of vibration of the ions since a last irradiation with laser pulses to add momentum to the ions.

5. The angle measurement method according to claim 3, wherein in the second laser irradiation operation, the laser irradiation part irradiates the ions with a plurality of laser pulses in every half cycle of vibration of the ions after an integer multiple of the cycle of vibration of the ions since a last irradiation with laser pulses to add momentum to the ions.

* * * * *